United States Patent
Natarajan et al.

(10) Patent No.: US 7,706,294 B2
(45) Date of Patent: Apr. 27, 2010

(54) APPARATUS AND METHOD FOR ENABLING INTELLIGENT FIBRE-CHANNEL CONNECTIVITY OVER TRANSPORT

(75) Inventors: Sriram Natarajan, Sunnyvale, CA (US); Sharat Prasad, San Jose, CA (US); Yu Deng, Mulpitas, CA (US); Yanfeng Wang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/403,896

(22) Filed: Mar. 31, 2003

(65) Prior Publication Data

US 2005/0074027 A1    Apr. 7, 2005

(51) Int. Cl.
G01R 31/08 (2006.01)
H04L 12/28 (2006.01)
H04J 3/16 (2006.01)
H04B 10/08 (2006.01)

(52) U.S. Cl. .................. 370/252; 370/389; 370/466; 398/25

(58) Field of Classification Search ............ 370/248, 370/249, 419, 252, 253, 235, 236, 242, 241, 370/216, 227, 228, 225, 389, 401, 465, 466; 709/223, 224; 710/306
See application file for complete search history.

(56) References Cited

U.S. PATENT DOCUMENTS

| | | | |
|---|---|---|---|
| 5,610,745 A | 3/1997 | Bennett | 359/139 |
| 5,638,518 A | 6/1997 | Malladi | 395/200.21 |
| 5,898,512 A * | 4/1999 | Arai | 398/30 |
| 6,393,489 B1 | 5/2002 | Sambamurthy et al. | 709/250 |
| 6,396,810 B1 * | 5/2002 | Hebel | 370/248 |
| 6,484,202 B1 * | 11/2002 | LeDuc et al. | 709/224 |
| 6,507,923 B1 * | 1/2003 | Wall et al. | 714/712 |
| 6,925,054 B1 * | 8/2005 | Atterton et al. | 370/218 |
| 7,047,346 B2 * | 5/2006 | Hodapp, Jr. | 710/306 |
| 7,145,877 B2 * | 12/2006 | Natarajan et al. | 370/235 |
| 2001/0050901 A1 * | 12/2001 | Love et al. | 370/235 |
| 2002/0090007 A1 | 7/2002 | Kamiya et al. | 370/476 |
| 2002/0176450 A1 | 11/2002 | Kong et al. | 370/539 |
| 2003/0016683 A1 | 1/2003 | George et al. | 370/404 |
| 2003/0081551 A1 * | 5/2003 | Yazaki et al. | 370/232 |
| 2003/0091037 A1 | 5/2003 | Latif et al. | 370/355 |
| 2003/0202474 A1 * | 10/2003 | Kreuzenstein et al. | 370/235 |

FOREIGN PATENT DOCUMENTS

WO    WO 01/43328    6/2001

OTHER PUBLICATIONS

Fibre Channel Switch Fabric (FX-SW) Rev. 3.3:, NCITS Working Draft Proposed American National Standard for Information Technology, Oct. 21, 1997.

(Continued)

*Primary Examiner*—Nittaya Juntima

(57) ABSTRACT

The link status of a Fibre-Channel link interconnecting two Fibre-Channel ports may be determined by a third entity distinct from the two Fibre-Channel ports. The third entity may be a transport interface used to connect one of the Fibre-Channel ports to a transport network that carries the link. The transport interface may also learn the Fibre-Channel port types of the two ports.

20 Claims, 3 Drawing Sheets

OTHER PUBLICATIONS

"Fibre Channel Switch Fabric—2 (FC-SW-2) Rev. 5.3" NCITS Working Draft Proposed American National Standard for Information Technology, Jun. 26, 1001.

"Fibre Channel Framing and Signaling (FC-FS), Rev. 1.70", NCITS Working Draft Proposed American National Standard for Information Technology, Feb. 8, 2002.

* cited by examiner

APPARATUS AND METHOD FOR ENABLING INTELLIGENT FIBRE-CHANNEL CONNECTIVITY OVER TRANSPORT

STATEMENT OF RELATED APPLICATIONS

The present invention is related to the subject matter of U.S. patent application Ser. No. 10/166,213, now U.S. Pat. No. 7,471,628, entitled "INTELLIGENT FLOW CONTROL MANAGEMENT TO EXTEND FIBRE-CHANNEL LINK FULL PERFORMANCE RANGE," filed on Jun. 10, 2002, the contents of which are herein incorporated by reference for all purposes in their entirety.

The present invention is also related to the subject matter of U.S. patent application Ser. No. 10/366,867, entitled "FIBRE-CHANNEL OVER-SUBSCRIPTION OVER DWDM/SONET/SDH OPTICAL TRANSPORT SYSTEMS," filed on Feb. 13, 2003, the contents of which are herein incorporated by reference for all purposes in their entirety.

The present invention is related to the subject matter of U.S. patent application Ser. No. 10/305,640, now U.S. Pat. No, 7,346,058, entitled "MULTIPROTOCOL ENCAPSULATION SYSTEM AND METHOD," filed on Nov. 27, 2002, the contents of which are herein incorporated by reference for all purposes in their entirety.

The present invention is related to the subject matter of and being co-filed with U.S. patent application Ser. No. 10/403,396, now U.S. Pat. No. 7,145,877, entitled "APPARATUS AND METHOD FOR DISTANCE EXTENSION OF FIBRE-CHANNEL OVER TRANSPORT," the contents of which are herein incorporated by reference for all purposes in their entirety.

BACKGROUND OF THE INVENTION

The present invention relates to data networking, telecommunication networking, and, in one embodiment, to systems and methods for enhancing Fibre-Channel links.

The Fibre-Channel standard defines a bi-directional link protocol, used to connect computers to disk drives and other peripherals. A typical Fibre-Channel link may have a bandwidth of 1063 Mbps and a span of up to 10 kilometers.

One typical application of Fibre-Channel is interconnecting computer CPUs with arrays of disk drive in large scale computing centers, as would be used in, e.g., financial transaction processing. For reasons of fault tolerance, it is desirable to locate redundant storage resources at remote locations. The advent of high data rate metropolitan optical networks including such networks based on the use of dense wave division multiplexing (DWDM) and/or SONET/SDH transport systems makes it possible to extend so-called storage area networks (SANs) that carry multiple Fibre-Channel links over distances much longer than 10 kilometers.

It is useful to apply the widely prevalent Fibre-Channel standard to communicate across DWDM networks and therefore minimize the need to redesign computing center equipment. Such DWDM networks can themselves employ protocol such as Gigabit Ethernet, 10 Gigabit Ethernet, SONET, etc. A transport interface is then used to interface the Fibre-Channel port to the transport network.

The transport interface encapsulates transmitted Fibre-Channel frames within transport layer frames or packets and also deencapsulates received Fibre-Channel frames from the transport layer frames or packets.

As explained in the co-filed U.S. patent application Ser. No. 10/403,396, now U.S. Pat. No. 7,145,877, entitled "APPARATUS AND METHOD FOR DISTANCE EXTENSION OF FIBRE-CHANNEL OVER TRANSPORT," and in "INTELLIGENT FLOW CONTROL MANAGEMENT TO EXTEND FIBRE-CHANNEL LINK FULL PERFORMANCE RANGE" the flow control scheme incorporated within the Fibre-Channel standard does not cope well with links that extend much further than 10 km because of the delays inherent in receiving an indication of readiness for further transmissions from a distant port. As explained therein, the transport interface may incorporate a supplemental buffer in conjunction with other enhancements to extend the operating distance of a Fibre-Channel link while assuring that the ports do not overflow their internal receive buffers.

It is also desirable to combine multiple Fibre-Channel links onto the same transport layer link. A technique for accomplishing this is presented in U.S. patent application Ser. No. 10/366,867, entitled "FIBRE-CHANNEL OVER-SUBSCRIPTION OVER DWDM/SONET/SDH TRANSPORT SYSTEMS." By use of the techniques described therein, one may combine multiple Fibre-Channel links onto a single transport link even where the transport link capacity is oversubscribed, i.e., the combined peak Fibre-Channel bandwidths exceed transport link capacity.

There are various types of Fibre-Channel ports. For example, N_Ports are used by individual Fibre-Channel nodes to communicate with one another and with Fibre-Channel switches. A Fibre-Channel switch port may operate as either an F_Port when communicating with a Fibre-Channel node or as an E_Port when communicating with another Fibre-Channel switch. To support the flow control and over-subscription features mentioned above, the transport interface needs to know the port type on each end of the link. This can of course be preprogrammed but it would be desirable for the transport interface to automatically detect the port types so that they need not be programmed in advance-by an operator.

SUMMARY OF THE INVENTION

By virtue of embodiments of the present invention, the link status of a Fibre-Channel link interconnecting two Fibre-Channel ports may be determined by a third entity distinct from the two Fibre-Channel ports. The third entity may be a transport interface used to connect one of the Fibre-Channel ports to a transport network that carries the link. The transport interface may also learn the Fibre-Channel port types of the two ports.

A first aspect of the present invention provides a method for operating a network interface to determine status of first and second Fibre-Channel ports that communicate via the network interface. The method includes: monitoring link establishment frames communicated between the first Fibre-Channel port and the second Fibre-Channel port and, based on the link establishment frames, determining a link status between the first Fibre-Channel port and the second Fibre-Channel port.

A second aspect of the present invention provides apparatus for operating a network interface to determine status of first and second Fibre-Channel ports that communicate via the network interface. The apparatus includes: a first connection to a local Fibre-Channel port, a second connection to a remote Fibre-Channel port via a transport network, and a processor that monitors link establishment frames communicated between the first Fibre-Channel port and the second Fibre-Channel port via the network interface and, based on the link establishment frames, determines a link status between the first Fibre-Channel port and the second Fibre-Channel port.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative application in which a Fibre-Channel link is tunneled through a transport network. In one particular implementation, the transport network is implemented as a metropolitan optical network. Fibre-Channel frames are transported through the network encapsulated within packets such as Ethernet packets. Optical network details and the encapsulation details are not germane to the description of the present invention but it will be appreciated that Ethernet packets, e.g., may be carried on optical signals modulated with e.g., 1 Gbps, 2.5 Gbps, or 10 Gbps data waveforms. Also, SONET frames may be used, e.g., instead of Ethernet packets. Multiple optical signals also may share the same fiber by use of wavelength division multiplexing (WDM) techniques.

Figure 1:
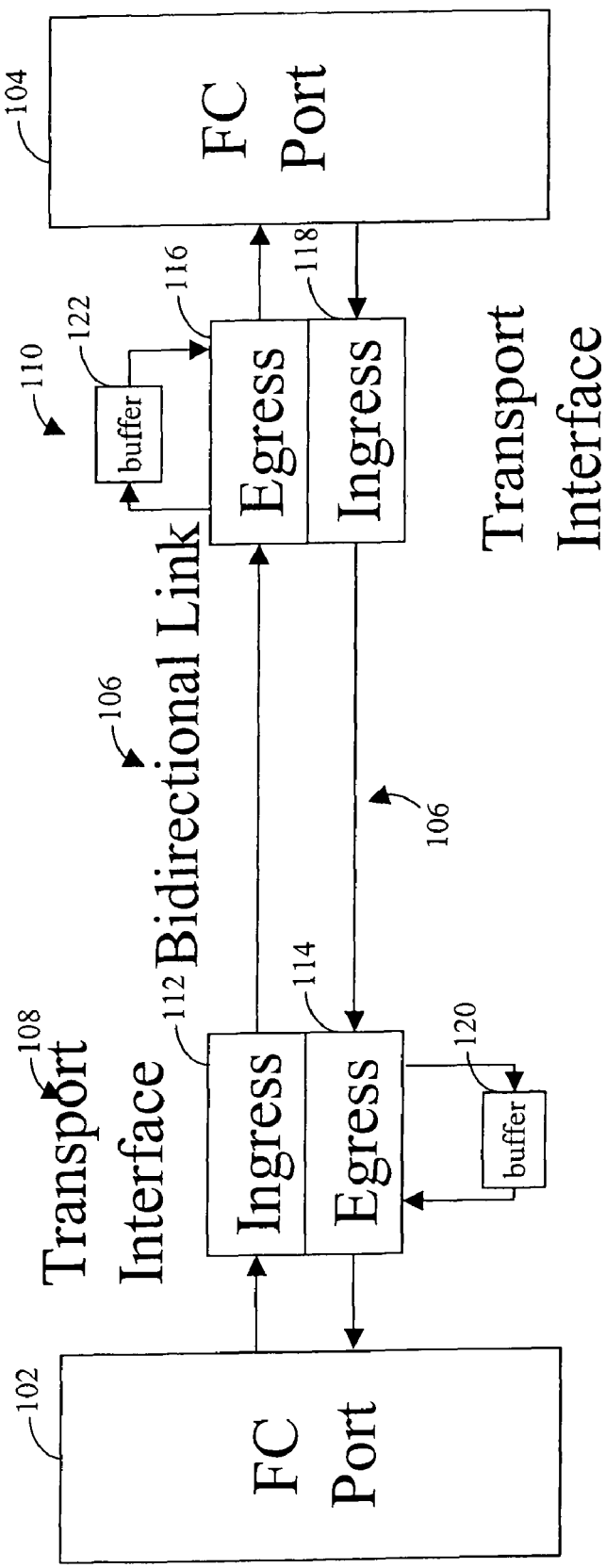
FIG. 1 depicts a Fibre-Channel link according to one embodiment of the present invention.

FIG. 1 depicts a Fibre-Channel link that is carried through a metropolitan network by use of transport network interfaces according to one embodiment of the present invention. Two Fibre-Channel ports 102 and 104 exchange data in accordance with the Fibre-Channel standard as described in, e.g., "Fibre-Channel Framing and Signaling (FC-FS), Rev 1.70," NCITS Working Draft Proposed American National Standard for Information Technology, Feb. 8, 2002, the contents of which are herein incorporated by reference in their entirety. Fibre-Channel ports 102 and 104 may provide connectivity to devices such as, e.g., disk drives, disk storage arrays, magnetic tape drives, processing units, printers, etc.

A bi-directional link 106 interconnects the Fibre-Channel ports, carrying the Fibre-Channel frames encapsulated within, e.g., Ethernet packets. Encapsulation details are found in U.S. patent application Ser. No. 10/305,640, now U.S. Pat. No. 7,346,058. The link 106 can be either an actual physical link or a tunnel through a network cloud. Transport network interfaces 108 and 110 interface Fibre-Channel ports 102 and 104 to bi-directional link 106. Transport network interface 108 includes an ingress block 112 to encapsulate frames to be transmitted and an egress block 114 to deencapsulate Fibre-Channel frames from received packets. Similarly, transport network interface 110 includes an ingress block 116 and an egress block 118.

According to one embodiment of the present invention, transport network interfaces 108 and 110, in addition to encapsulating and deencapsulating Fibre-Channel frames, also operate a supplemental flow control mechanism to optimize throughput over longer distances. In support of the supplemental flow control mechanism, transport network interfaces 108 and 110 operate supplemental buffers 120 and 122, respectively. A description of the supplemental flow mechanism is found in U.S. patent application Ser. No. 10/403,396, now U.S. Pat. No. 7,145,877, entitled "APPARATUS AND METHOD FOR DISTANCE EXTENSION OF FIBRE-CHANNEL OVER TRANSPORT.

To support enhanced flow control and other transport network functionality, the transport network interfaces 108 and 110 determine the link status of the Fibre-Channel link between Fibre-Channel ports 102 and 104. Transport network interfaces 108 and 110 also determine the port types of Fibre-Channel ports 102 and 104. Transport network interfaces 108 and 110 monitor frames exchanged between interfaces 108 and 110 to determine link status and the port types.

Figure 2:
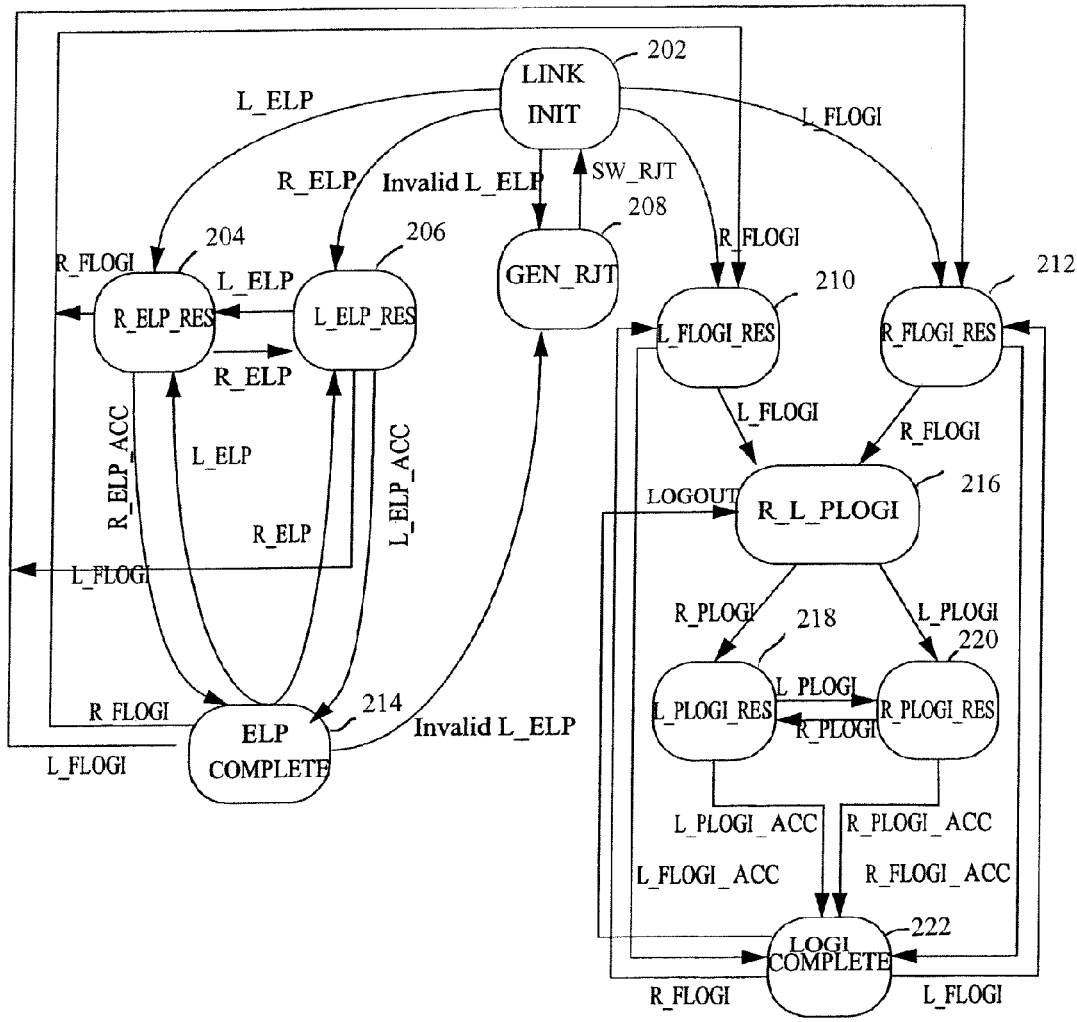
FIG. 2 depicts a transition diagram for a state machine operating in a transport network interface of the Fibre-Channel link of FIG. 1 according to one embodiment of the present invention.

FIG. 2 depicts a state transition diagram for a state machine operating in one of transport network interfaces 108 and 110 according to one embodiment of the present invention. The flow through the state transition diagram will depend on the type of port at each end.

A brief summary of Fibre-Channel link establishment procedures will help clarify the description of the state transition diagram. The frames exchanged will depend on the port types at each end of the link. As previously indicated, a node operates an N_Port. Switches operate ports that can act as either an E_Port (when connected to another switch) or as an F_Port (when connected to a node).

When an N_Port wishes to establish a link it first sends a FLOGI (fabric login) frame which acts as a request to an F_Port. If the other port is in fact an F_Port, then the response is an FLOGI_ACC and a link is established between the F_Port and the N_Port. If the other port is an N_Port, the response will be a FLOGI rather than an FLOGI_ACC. This causes the original requesting port to send a PLOGI (port login) frame. The opposite N_Port will respond with a PLOGI_ACC to complete the link.

A switch port (configurable as either an E_Port or an F_Port) will first attempt to access the opposite port as if it were on a switch by sending an ELP (Exchange Link Parameters). If the opposite port is on a switch it may respond with an ELP_ACC leading to establishment of the link between two ports that are now configured as E_ports. If the opposite port is a node instead, the response will be an FLOGI and the originally requesting port may respond with an FLOGI_ACC which leads to establishment of a link between the switch's port, now configured as an F_Port and the node's N_Port.

It will be appreciated that there are also acknowledgements and flow control ready indications that occur in response to these link requests and acceptances. These acknowledgements and ready indications are not relevant to the present discussion.

A transport interface will be able to monitor the request and acceptance frames as they are exchanged between its local Fibre-Channel port and the remote Fibre-Channel port. Either the local port or the remote port may request a link. Also, if an ELP is received from a local switch port specifying a flow control scheme that is not supported by the transport interface, the transport interface may block this ELP and issue its own reject message (SW_RJT) back to the local switch port. The state machine takes into account all of these possibilities.

The states are listed in the following table:

TABLE 1

| State Name | Designation in FIG. 2 | Summary Description |
|---|---|---|
| LINK_INIT | 202 | Link Initialization State. This state is reached on reset or on link failure condition. |
| R_ELP_RES | 204 | Remote ELP Response State. The state machine remains in this state until an ELP response is received from remote port. |
| L_ELP_RES | 206 | Local ELP Response State. The state machine remains in this state until an ELP response is received from local port. |
| GEN_RJT | 208 | Generate Switch Reject State. An SW_RJT frame is generated in this state. |
| L_FLOGI_RES | 210 | Local FLOGI Response State. The state machine remains in this state until a FLOGI response is received from local port. |
| R_FLOGI_RES | 212 | Remote FLOGI Response State. The state machine remains in this state until a FLOGI response is received from remote port. |
| ELP_COMPLETE | 214 | ELP Completion State. |
| R_L_PLOGI | 216 | Remote/Local PLOGI wait State. The state machine remains in this state until a local or remote PLOGI frame is received. |
| L_PLOGI_RES | 218 | Local PLOGI Response State. The state machine remains in this state until local PLOGI response is received. |
| R_PLOGI_RES | 220 | Remote PLOGI Response State. The state machine remains in this state until remote PLOGI response is received. |
| LOGI_COMPLETE | 222 | FLOGI/PLOGI Completion State. |

The state transitions are listed in the following table:

TABLE 2

| Current State | Next State | Transition Condition | Comment |
|---|---|---|---|
| LINK_INIT | LINK_INIT | Remain in this state until a valid control frame after idles are seen | Enters this state upon power-on reset or detection of link initialization protocol like OLS (off-line state), NOS (non-operational state) etc or Loss of light or Loss of sync. |
| LINK_INIT | R_ELP_RES | If ELP frame is detected from local port with valid flow control code (=0x2) | |
| LINK_INIT | L_ELP_RES | If ELP frame is detected from remote port with valid flow control code | |
| LINK_INIT | GEN_RJT | If ELP frame is detected from local port with invalid flow control code. | Unsupported flow control type |
| LINK_INIT | L_FLOGI_RES | If FLOGI frame is detected from remote port | |
| LINK_INIT | R_FLOGI_RES | If FLOGI frame is detected from local port | |
| GEN_RJT | LINK_INIT | Transition happens after SW_RJT frame is generated by transport interface | Reason = Logical Error Reason Code = Unknown flow control code |
| R_ELP_RES | ELP_COMPLETE | If R_ELP_ACC frame is received from remote port | |

TABLE 2-continued

| Current State | Next State | Transition Condition | Comment |
| --- | --- | --- | --- |
| R_ELP_RES | L_FLOGI_RES | If FLOGI frame is received from remote port | |
| R_ELP_RES | L_ELP_RES | If ELP frame is received from remote port and the local port's Switch_Name is higher than remote port | |
| L_ELP_RES | ELP_COMPLETE | If L_ELP_ACC frame is received from local port | |
| L_ELP_RES | R_FLOGI_RES | If FLOGI frame is received from local port | |
| L_ELP_RES | R_ELP_RES | If ELP frame is received from local port and the local port's Switch_Name is higher than remote port | |
| ELP_COMPLETE | R_ELP_RES | If ELP frame is detected from local port with valid flow control code (=0x2) | |
| ELP_COMPLETE | L_ELP_RES | If ELP frame is detected from remote port with valid flow control code (=0x2) | |
| ELP_COMPLETE | GEN_RJT | If ELP frame is detected from local port with invalid flow control code. | |
| ELP_COMPLETE | L_FLOGI_RES | If FLOGI frame is received from remote port | |
| ELP_COMPLETE | R_FLOGI_RES | If FLOGI frame is received from local port | |
| L_FLOGI_RES | LOGI_COMPLETE | If FLOGI_ACC frame is received from local port | |
| L_FLOGI_RES | R_L_PLOGI | If FLOGI frame is received from local port | |
| R_FLOGI_RES | LOGI_COMPLETE | If FLOGI_ACC frame is received from remote port | |
| R_FLOGI_RES | R_L_PLOGI | If FLOGI frame is received from remote port | |
| R_L_PLOGI | L_PLOGI_RES | If PLOGI is detected from remote port and wait for PLOGI_ACC from local port | |
| R_L_PLOGI | R_PLOGI_RES | If PLOGI is detected from local port and wait for PLOGI_ACC from remote port | |
| L_PLOGI_RES | LOGI_COMPLETE | If PLOGI_ACC frame is received from local port | |
| R_PLOGI_RES | LOGI_COMPLETE | If PLOGI_ACC frame is received from remote port | |
| LOGI_COMPLETE | L_FLOGI_RES | If FLOGI frame is received from remote port | |
| LOGI_COMPLETE | R_FLOGI_RES | If FLOGI frame is received from local port | |
| LOGI_COMPLETE | R_L_PLOGI | If LOGOUT frame is received from local port or remote port | |
| L_PLOGI_RES | R_PLOGI_RES | If PLOGI frame is received from local port and local port name higher than remote port name | |
| R_PLOGI_RES | L_PLOGI_RES | If PLOGI frame is received from remote port and remote port name higher than local port name | |

The LINK_INIT state is reached after power-on reset, detection of a link initialization protocol such as OLS (off-line state) or NOS (non-operational state), loss of light, or loss of synchronization. The transport interface remains in the LINK_INIT state 202 until a valid control frame (FLOGI, PLOGI, or ELP) is received from either the remote port or the local port. If a locally generated ELP (L_ELP) is received, the R_ELP_RES state 204 is reached. If a remotely generated ELP (R_ELP) is received, the L_ELP_RES state 206 is reached. If a locally generated FLOGI (L_FLOGI) is received, the R_FLOGI_RES 212 state is reached. If a remotely generated FLOGI (R_FLOGI) is received, the L_FLOGI_RES 210 state is reached.

Another possibility is that an ELP is received from the local port (L_ELP) but that it specifies a flow control type that is not supported by the transport interface. This ELP will be rejected by the transport interface itself at the GEN_RJT state 208. In the GEN_RJT state 208, the transport interface sends an SW_RJT frame back to the local port to indicate that the flow control type is unknown. After the GEN_RJT state 208, the transport interface returns to the LINK_INIT state 202.

In the R_ELP_RES state 204, the state machine is awaiting an ELP response from the remote port. If this remote ELP response (R_ELP_ACC) is received, the ELP_COMPLETE state 214 is reached indicating link establishment between two E_ports. If on the other hand, a FLOGI frame is received from the remote port (R_FLOGI), this indicates that the remote port is a node operating an N_Port and has requested a link. This leads the state machine to the L_FLOGI_RES state 210 and the local port will be expected to operate as an F_Port rather than an E_Port.

Again, referring to the R_ELP_RES state 204, if an ELP frame from the remote port (R_ELP) rather than a R_ELP_ACC is received and the local port's "Switch_Name" parameter is higher than the remote's port, then the L_ELP_RES state 206 is reached. The remote port is now the requesting port and an answer is awaited from the local port.

In the L_ELP_RES state 206, the transport interface awaits an ELP response (L_ELP_ACC) from the local port. Transitions from the L_ELP_RES state 206 are largely parallel to those from the R_ELP_RES state 204. If the L_ELP_ACC is received, the ELP_COMPLETE state 214 is reached. If a L_FLOGI frame is received instead, indicating that the local port is operating as an N_Port, then the R_FLOGI_RES state 212 is reached to await a response from the remote port to the L_FLOGI. If a locally generated ELP request frame (L_ELP) is received and the local port's switch name is higher than the remote port's then the local port is treated as the link requester and processing shifts to the R_ELP_RES state 204 to await a response from the remote port.

The ELP_COMPLETE state 214 signifies that a link has been established between E_Ports. Receipt of an R_FLOGI causes a transition to the L_FLOGI_RES state 210. Receipt of an L_FLOGI causes a transition to the R_FLOGI_RES state 212. Receipt of an L_ELP causes a transition to the R_ELP_RES state 204. Receipt of an R_ELP causes a transition to the L_ELP_RES state 206. Receipt of an L_ELP with an invalid flow control code causes a transition to the GEN_RJT state 208 followed by return to LINK_INIT state 202.

The L_FLOGI_RES state 210 signifies that the transport interface is waiting for a FLOGI response from the local port (L_FLOGI_ACC). If this is received then the LOGI_COMPLETE state 222 is reached and a link has been established between an F_Port and an N_Port. If instead a FLOGI is received from the local port (L_FLOGI) this indicates that the local port is an N_Port and the R_L_PLOGI state 216 is reached to await a PLOGI frame from either the remote port or the local port.

In the R_FLOGI_RES state 212, the transport interface is waiting for a FLOGI response from the remote port (R_FLOG_ACC). If this is received then the LOGI_COMPLETE state 222 is reached and a link has been established between and F_Port and an N_Port. If instead a FLOGI is received from the remote port (R_FLOGI) this indicates that the remote port is an N_Port and the R_L_PLOGI state 216 is reached to await a PLOGI frame from either the remote port or the local port.

Now referring to the R_L_PLOGI state 216, if a PLOGI frame is received from the remote port (R_PLOGI), the L_PLOGI_RES state 218 is reached. If the PLOGI frame is received from the local port then the R_PLOGI_RES state 220 is reached.

In the L_PLOGI_RES state 218, the transport interface awaits a PLOGI response from the local port (L_PLOGI_ACC). If this is received then the LOGI_COMPLETE state 222 is reached and there is a link between two N_ports. If instead a PLOGI is received from the local port (L_PLOGI) and the local port name is higher than the remote port name, the R_PLOGI_RES state 220 is reached. The local port then becomes the requesting port.

The R_PLOGI_RES state 220 is similar to the L_PLOGI_RES state 218. The transport interface awaits a PLOGI response from the remote port (R_PLOGI_ACC). If this is received then the LOGI_COMPLETE state 222 is reached and there is a link between two N_ports. If instead a PLOGI is received from the remote port (R_PLOGI) and the remote port name is higher than the local port name, the L_PLOGI_RES state 218 is reached. The remote port then becomes the requesting port.

The LOGI_COMPLETE state 222 indicates a completed link either between two N_ports or an F_port and an N_port. Receipt of a LOGOUT frame from either port leads the state machine back to the R_L_PLOGI state 216. It is already then known that both ports are N ports for any new link. Receipt of an R_FLOGI frame leads the state machine to the L_FLOGI_RES state 210. Receipt of an L_FLOGI frame leads the state machine to the R_FLOGI_RES state 212.

As the state transition diagram is traversed, the transport interface learns the port types on either end of link that is being established. The FLOGI, PLOGI, and ELP frames and the responses to them include various service parameters of the transmitting port including the buffer-to-buffer credit value that is being granted. The transport interface makes note of this credit value and modifies it as disclosed in the co-filed U.S. patent application Ser. No. 10/403,396, now U.S. Pat. No. 7,145,877, entitled "APPARATUS AND METHOD FOR DISTANCE EXTENSION OF FIBRE-CHANNEL OVER TRANSPORT.

It will be appreciated that operation of the state machine does not require modification of the normal operation of the local and remote Fibre-Channel ports. The link establishment traffic is monitored to learn the link state and port types at each end of the link.

The above-described mechanism can also be used for intelligent connectivity between Fibre Channel bridge ports (B_Ports) and E_Ports. E-Port/B_Port communication, like communication between E_Ports, involves the use of ELP frames. The B_Ports can be distinguished by detecting the setting of a special B_Port bit in the ELP request payload.

Network Device Details

Figure 3:
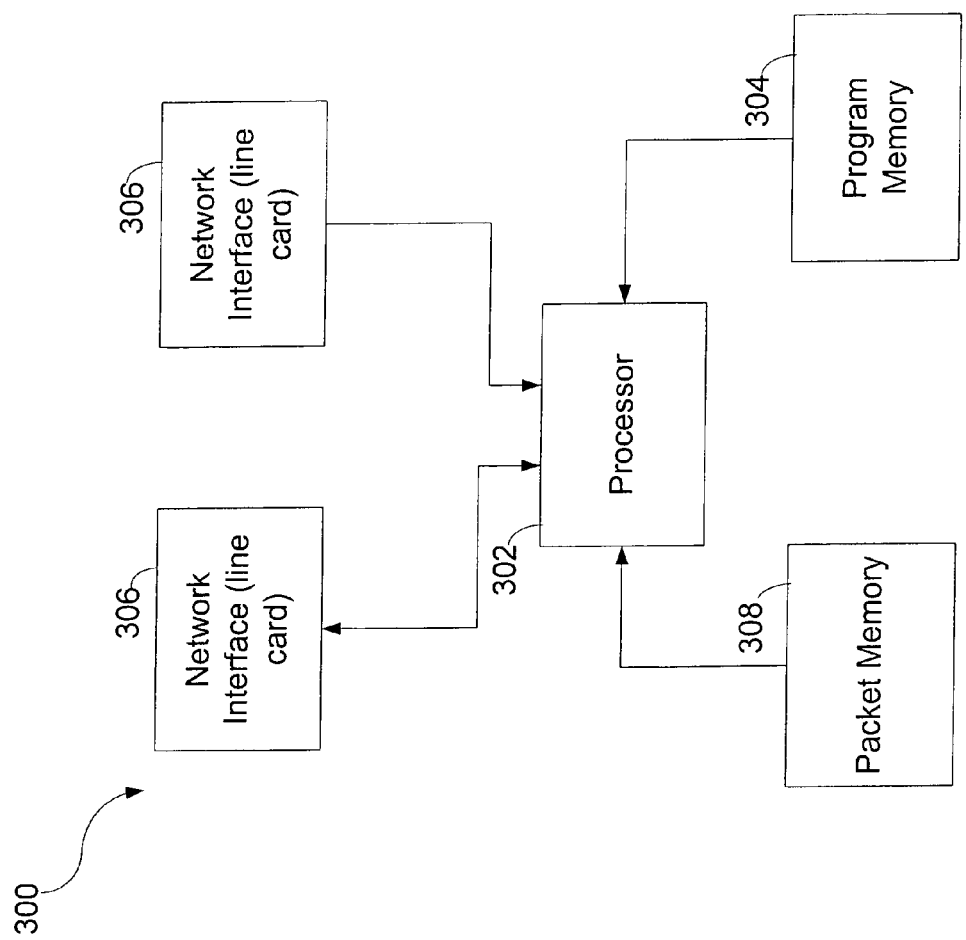
FIG. 3 depicts a network device according to one embodiment of the present invention.

FIG. 3 depicts a network device 300 that may be used to implement, e.g., the transport network interface of FIG. 1 and/or operate the state machine described in reference to FIG. 2. In one embodiment, network device 300 is a programmable machine that may be implemented in hardware, software or any combination thereof. A processor 302 executes code stored in a program memory 304. Alternatively, processor 302 may be implemented in part by hardware such as custom logic, e.g., a programmable logic device, field programmable gate array, etc. Processor 302 may perform the encapsulation, de-encapsulation, and flow control operations referred to above. Program memory 304 is one example of a computer-readable storage medium. Program memory 304 can be a volatile memory. Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 300 interfaces with physical media via a plurality of line cards 306. For example, one of line cards 306 may couple to an optical fiber and may incorporate appropriate physical and link layer functionality. In one implementation, there may be a line card for supporting transport links and another line card for connecting to local Fibre-Channel ports. The line card for supporting transport links may incorporate a Gigabit Ethernet interface, 10-Gigabit Ethernet interface, a SONET interface, etc. As packets are received, processed, and forwarded by network device 300, they may be stored in a packet memory 308. Packet memory 308 may serve to implement buffers such as buffers 120 and 122. Network device 300 implements all of the network protocols and extensions thereof described above as well as the data networking features provided by the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method comprising:
at a transport network interface apparatus associated with a first Fiber-Channel port that is to communicate over a transport network with a second Fiber-Channel port, monitoring link establishment frames originated by and communicated between said first Fibre-Channel port and said second Fibre-Channel port; and
at the transport network interface apparatus, based on said link establishment frames, determining said link status between said first Fibre-Channel port and said second Fibre-Channel port and port types among a plurality of possible port types of said first and second Fibre Channel ports using a state machine, wherein flow through states of the state machine depends on the link status and port types of the first Fibre-Channel port and the second Fibre-Channel port according to the link establishment frames exchanged between the first Fibre-Channel port and the second Fibre-Channel port.

2. The method of claim 1 wherein said determining comprises determining that said first Fibre-Channel port comprises an N_Port and said second Fibre-Channel port comprises an N_port.

3. The method of claim 1 wherein said determining comprises determining that said first Fibre-Channel port comprises an N_port and said second Fibre-Channel port comprises an F_port.

4. The method of claim 1 wherein said determining comprises determining that said first Fibre-Channel port comprises an E_port and said second Fibre-Channel port comprises an E_port.

5. The method of claim 1 wherein said determining comprises determining that a link establishment frame is expected from one of said first Fibre-Channel port and said second Fibre-Channel port.

6. The method of claim 1 wherein monitoring comprises monitoring link establishment frames formatted according to a protocol selected from the group consisting of Gigabit Ethernet, 2.5 Gigabit Ethernet, 10 Gigabit Ethernet, and SONET networks.

7. The method of claim 1, wherein determining comprises determining whether the link establishment frames comprise an exchange link parameter for a flow control scheme that is not supported, and further comprising blocking the exchange link parameter and generating a reject message to the first Fibre-Channel port when an unsupported flow control scheme is detected.

8. The method of claim 1, wherein determining comprises using the state machine that defines a plurality of states, including a link initialization state, a remote exchange link response state that persists until an exchange link response is received from a remote port corresponding to the second Fibre-Channel port, a local exchange link response state that persists until an exchange link response is received from a local port corresponding to the first Fibre-Channel port, a generate switch reject state, a local fabric login response state that persists until a fabric login response is received from the local port, a remote fabric login response state that persists until a fabric login response is received from the remote port, an exchange link parameter completion state that is reached from the remote local exchange link response state or remote exchange link response state, a remote/local port login state that persists until a local or remote port login frame is received, a local port login response state that persists until a local port login response is received, a remote port login state that persists until a remote port login response is received, and a login complete state upon completion of fabric login or port login, and wherein determining comprises determining transitions between the plurality of states based on detected link establishment frames.

9. An apparatus comprising:
an ingress block configured to connect to a local Fibre-Channel port and to encapsulate frames to be transmitted over a transport network to a remote Fibre-Channel port;
an egress block configured to connect to the local Fibre-Channel port and to deencapsulate frames from packets received over the transport network; and
a processor that is configured to monitor link establishment frames originated by and communicated between said local Fibre-Channel port and said remote Fibre-Channel port and, based on said link establishment frames, to determine a link status between said local Fibre-Channel port and said remote Fibre-Channel port and port types of said local Fibre-Channel port said remote Fibre-Channel port, wherein the processor is configured to determine link status and port types using a state machine, wherein flow through states of the state machine depends on the link status and the port types among a plurality of possible port types of the local Fibre-Channel port and the remote Fibre-Channel port according to the link establishment frames exchanged between the local Fibre-Channel port and the remote Fibre-Channel port.

10. The apparatus of claim 9 wherein said processor determines that said local Fibre-Channel port comprises an N_Port and said remote Fibre-Channel port comprises an N_port.

11. The apparatus of claim 9 wherein said processor determines that said local Fibre-Channel port comprises an N_port and said remote Fibre-Channel port comprises an F_port.

12. The apparatus of claim 9 wherein said processor determines that said local Fibre-Channel port comprises an E_port and said remote Fibre-Channel port comprises an E_port.

13. The apparatus of claim 9 wherein said processor determines that a link establishment frame is expected from one of said local Fibre-Channel port and said remote Fibre-Channel port.

14. The apparatus of claim 9 wherein said processor is configured to monitor link establishment frames formatted according to a protocol selected from the group consisting of Gigabit Ethernet, 2.5 Gigabit Ethernet, 10 Gigabit Ethernet, and SONET networks.

15. The apparatus of claim 9, wherein the processor is configured to determine whether the link establishment frames comprise an exchange link parameter for a flow control scheme that is not supported, and to block the exchange link parameter and generate a reject message to the first Fibre-Channel port when an unsupported flow control scheme is detected.

16. The apparatus of claim 9, wherein the processor is configured to determine link status and port types using the state machine that defines a plurality of states, including a link initialization state, a remote exchange link response state that persists until an exchange link response is received from the remote Fibre-Channel port, a local exchange link response state that persists until an exchange link response is received from the local Fibre-Channel port, a generate switch reject state, a local fabric login response state that persists until a fabric login response is received from the local Fibre-Channel port, a remote fabric login response state that persists until a fabric login response is received from the remote Fibre-Channel port, an exchange link parameter completion state that is reached from the remote local exchange link response state or remote exchange link response state, a remote/local port login state that persists until a local or remote port login frame is received, a local port login response state that persists until a local port login response is received, a remote port login state that persists until a remote port login response is received, and a login complete state upon completion of fabric login or port login, and wherein the processor is configured to determine transitions between the plurality of states based on detected link establishment frames.

17. A tangible computer readable memory storing code that, when executed by a processor, causes the processor to:
monitor link establishment frames originated by and communicated between a first Fibre-Channel port and a second Fibre-Channel port that communicate with each other over a transport network; and
based on said link establishment frames, determine link status between said first Fibre-Channel port and said second Fibre-Channel port and port types of said first Fibre-Channel port and said second Fibre-Channel port using a state machine, wherein flow through states of the state machine depends on the link status and the port types among a plurality of possible port types of the first Fibre-Channel port and the second Fibre-Channel port according to the link establishment frames exchanged between the first Fibre-Channel port and the second Fibre-Channel port.

18. The tangible computer readable memory of claim 17 wherein said code that causes the processor to determine said link status comprises code that, when executed by the processor, causes the processor to determine that a link establishment frame is expected from one of said first Fibre-Channel port and said second Fibre-Channel port.

19. The tangible computer readable memory of claim 17, wherein the code that causes the processor to determine comprises code that, when executed by the processor, causes the processor to determine whether the link establishment frames comprise an exchange link parameter for a flow control scheme that is not supported, and to block the exchange link parameter and generate a reject message to the first Fibre-Channel port when an unsupported flow control scheme is detected.

20. The tangible computer readable memory of claim 17, wherein the code that causes the processor to determine comprises code that, when executed by the processor, causes the processor to determine link status and port types using the state machine that defines a plurality of states, including a link initialization state, a remote exchange link response state that persists until an exchange link response is received from a remote port corresponding to the second Fibre-Channel port, a local exchange link response state that persists until an exchange link response is received from a local port corresponding to the first Fibre-Channel port, a generate switch reject state, a local fabric login response state that persists until a fabric login response is received from the local port, a remote fabric login response state that persists until a fabric login response is received from the remote port, an exchange link parameter completion state that is reached from the remote local exchange link response state or remote exchange link response state, a remote/local port login state that persists until a local or remote port login frame is received, a local port login response state that persists until a local port login response is received, a remote port login state that persists until a remote port login response is received, and a login complete state upon completion of fabric login or port login, and code that, when executed the processor, causes the processor to determine transitions between the plurality of states based on detected link establishment frames.

* * * * *